E. A. BLILER.
FLUID CLUTCH.
APPLICATION FILED JUNE 25, 1920.

1,404,571.

Patented Jan. 24, 1922.
3 SHEETS—SHEET 1.

INVENTOR.
E. A. Bliler

BY
[signature], ATTORNEY.

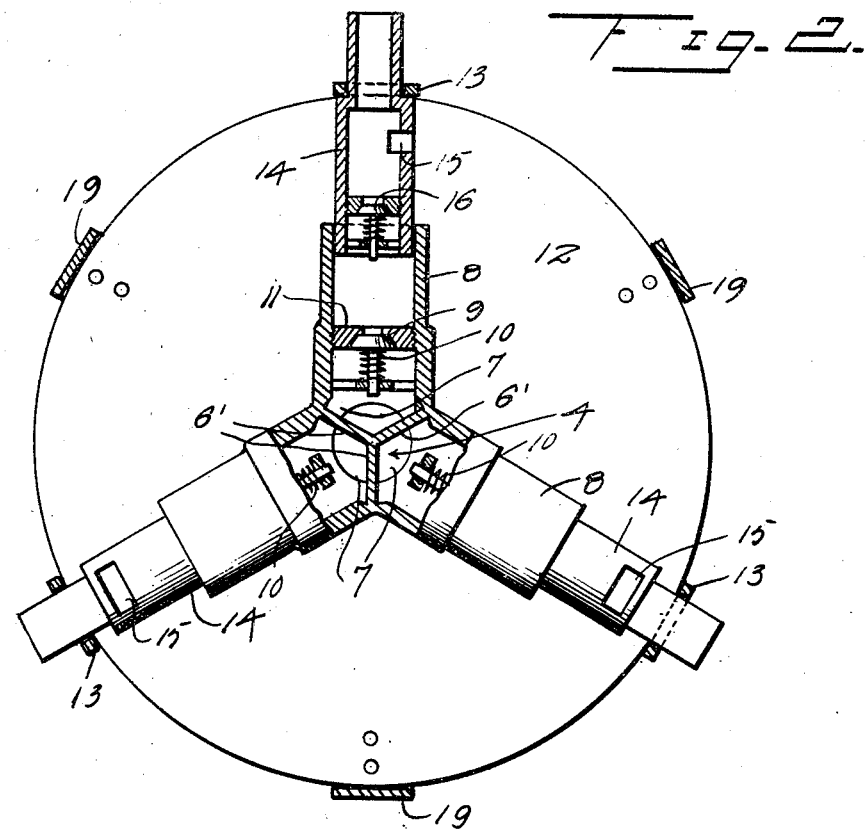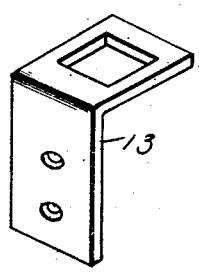

E. A. BLILER.
FLUID CLUTCH.
APPLICATION FILED JUNE 25, 1920.
1,404,571.
Patented Jan. 24, 1922.
3 SHEETS—SHEET 3.
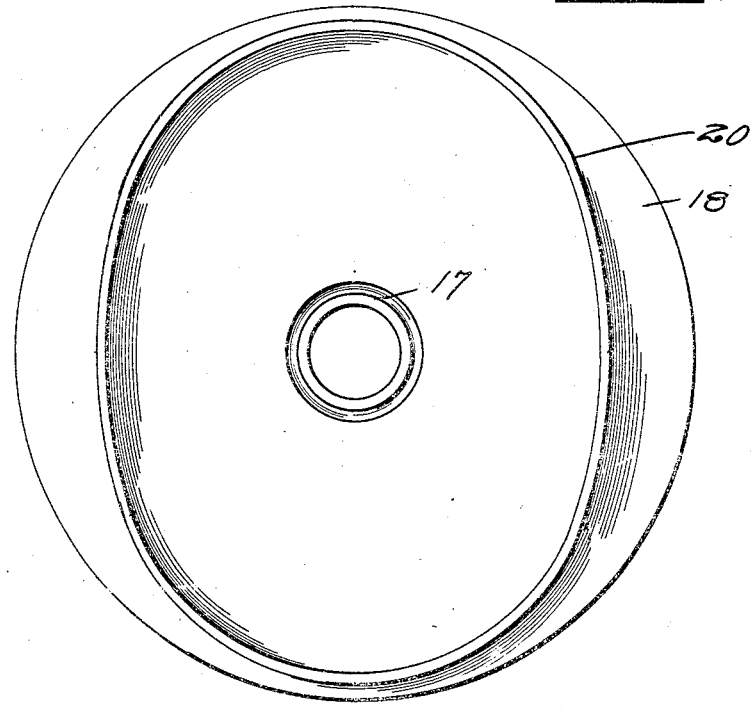
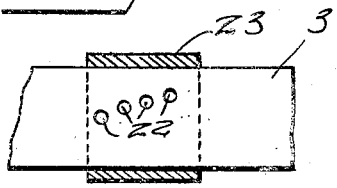
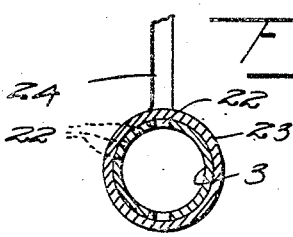
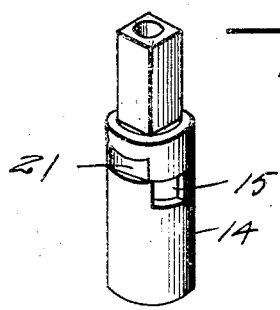
INVENTOR.
E. A. Bliler
BY
ATTORNEY.

UNITED STATES PATENT OFFICE.

EDWARD A. BLILER, OF McGILL, NEVADA.

FLUID CLUTCH.

1,404,571.

Specification of Letters Patent. Patented Jan. 24, 1922.

Application filed June 25, 1920. Serial No. 391,659.

*To all whom it may concern:*

Be it known that I, EDWARD A. BLILER, a citizen of the United States, residing at McGill, in the county of White Pine and State of Nevada, have invented certain new and useful Improvements in Fluid Clutches; and I do hereby declare the following to be a full, clear, and exact description of the invention, such as will enable others skilled in the art to which it appertains to make and use the same.

This invention relates to new and useful improvements in clutches for vehicles and has for its primary object the provision of means whereby different speeds may be obtained between the drive and driven shafts without the employment of gears and the necessity of shifting gears into and out of mesh with each other.

Another object of this invention is the provision of hydraulic means between the drive and driven shafts adapted to control the rotation of said shafts in relation to each other.

A further object of this invention is the provision of pumps operated by the drive shaft and adapted to force fluid into a chamber forming a part of the driven shaft and which chamber is provided with exhaust control means so that said shaft may be caused to rotate at the same rate of speed or at varying speeds in relation to the driving shaft or permit rotation of the drive shaft without rotating the driven shaft.

A still further object of this invention is the provision of a fluid clutch of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 2 is a transverse sectional view taken on the line 2—2 of Figure 1, Figure 3 is an end view illustrating a cam for actuating the pump, Figure 4 is a detail view illustrating the exhaust control means, Figure 5 is a detail perspective view illustrating one of the pistons.

Figure 6 is a detail sectional view illustrating the exhaust control means and taken at right angles to Figure 4.

Figure 7 is a perspective view illustrating one of the brackets.

Figure 1:
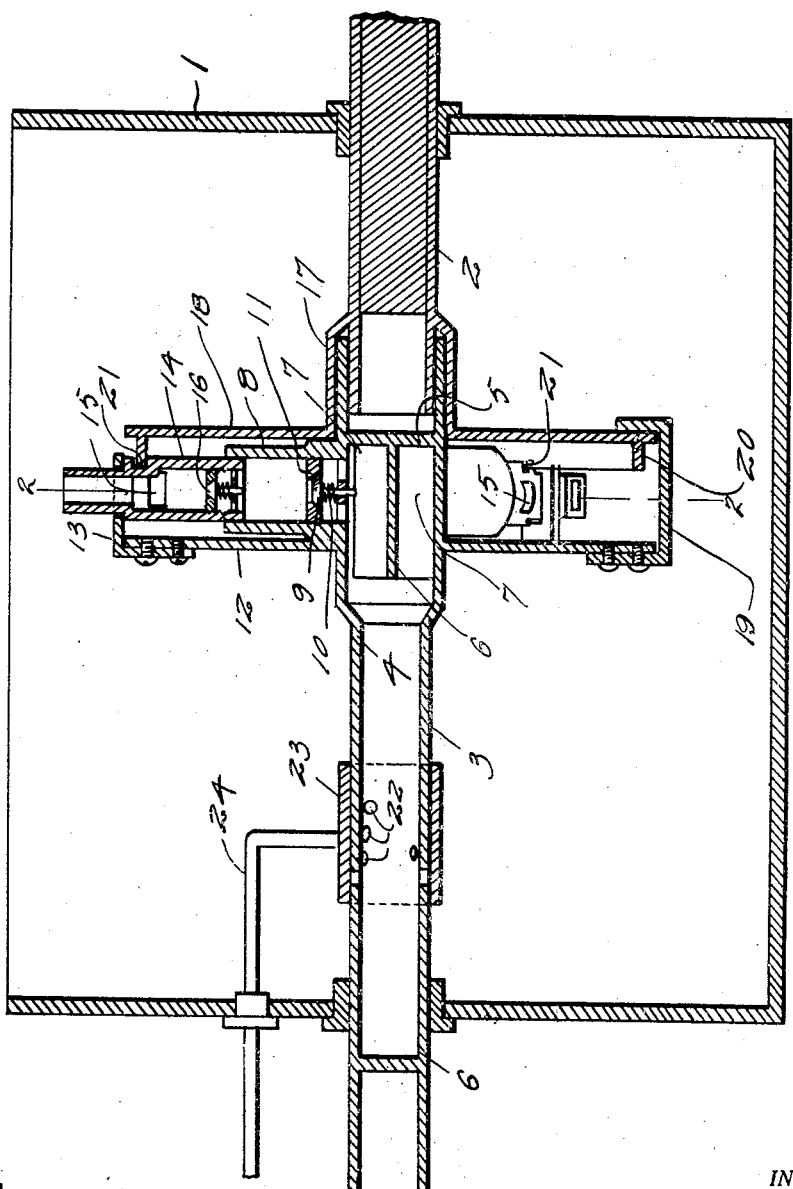
Figure 1 is a vertical sectional view illustrating a clutch constructed in accordance with my invention.

Referring in detail to the drawing, the numeral 1 indicates a casing or housing adapted to contain oil or other fluid and said casing has journaled therein drive and driven shafts 2 and 3. The driven shaft 3 has formed within the same a pressure chamber or reservoir 4 by closing the hollow part of said driven shaft by walls 5 and 6. The hollow portion of the driven shaft 3 has formed therein partitions 6' dividing a portion of the chamber 4 into compartments 7.

Radially extending cylinders 8 are formed on the driven shaft 3 and have communication with the compartments 7. The cylinders 8 have outwardly seating check valves 9 of the poppet type and provided with tension means or springs 10 and engage valve seats 11 that are threaded in the cylinders. The check valves 9 are adapted to prevent back pressure in the cylinders from the chamber 4. The cylinders extend in close proximity to a plate 12 formed on the driven shaft to which is secured a plurality of guide brackets 13. The guide brackets 13 slidably support the outer ends of pistons 14.

The pistons 14 have their outer ends squared to fit within corresponding openings formed in the guide brackets 13 and said pistons are of hollow formation provided with intake ports 15 adjacent their outer ends while their inner ends are provided with outwardly seating check valves 16 of the poppet type. The valves 16 are adapted to permit the fluid to pass through the pistons on their outward strokes but to prevent the escape of the fluid from the cylinders on the active or driving stroke of the pistons.

The drive shaft 2 has formed upon its inner end a hub 17 which rotatably engages the inner end of the driven shaft 3 and said hub is formed integrally with a cam plate 18. Guide brackets 19 are secured to the plate 12 and slidably engage the cam plate 18 to prevent separation of said plates but will permit one plate to turn free of the other. The cam plate 18 has formed upon its inner face a cam 20 adapted to fit within grooves 21 formed in the pistons so that upon rotation of the drive shaft the pistons will be reciprocated forcing fluid into the compartments 7 and thence into the chamber 4. The chamber 4 is provided with a series of exhaust openings 22 over which is movable a sleeve 23. The sleeve 23 is slidably mounted on the driven shaft 3 and has connected thereto a controlling lever 24 that extends outwardly of the casing 1.

When it is desired to rotate the shafts at the same rate of speed, the sleeve 23 is positioned to close all of the exhaust openings and on rotation of the drive shaft 2, the pistons are reciprocated forcing fluid from the casing 1 into the chamber 4 and when sufficient pressure has been created within said chamber 4, further reciprocation of the pistons will be prevented causing the shafts to move in unison and when it is desired to rotate the driven shaft 3 at a slower rate of speed than the drive shaft 2, one or more of the exhaust ports are uncovered by a movement of the sleeve 23 permitting a portion of the fluid within the chamber 4 to exhaust therefrom into the casing 1.

While I have shown and described the preferred embodiment of my invention, it will be understood that minor changes in construction, combination, and arrangement of parts may be made without departing from the spirit and scope of the invention as claimed.

Having thus described my invention, what I claim is:

A fluid clutch comprising a fluid containing casing, drive and driven shafts journaled in said casing, a pressure chamber formed in said driven shaft, a plate carried by the driven shaft, a cam carried by the drive shaft, means rotatably connecting the plate with the cam and adapted to permit relative movement of the plate and cam, cylinders formed on the driven shaft and in communication with the pressure chamber and positioned between the cam and plate, said pistons having notches therein to receive the cam, guide means carried by the plate for the pistons and means controlling the exhaust from the pressure chamber.

In testimony whereof I affix my signature in presence of two witnesses.

EDWARD A. BLILER.

Witnesses:
GEORGE BARNES,
R. C. BARNES.